United States Patent [19]

DiPietro

[11] Patent Number: 5,220,374
[45] Date of Patent: Jun. 15, 1993

[54] FILM SUPPLY MAGAZINE

[75] Inventor: Matthew DiPietro, Webster, N.Y.

[73] Assignee: Eastman Kodak Company, Rochester, N.Y.

[21] Appl. No.: 703,937

[22] Filed: May 22, 1991

[51] Int. Cl.⁵ .............................................. G03B 17/26
[52] U.S. Cl. .................................. 354/277; 378/182; 242/74
[58] Field of Search ................. 354/275–285; 242/74; 378/182, 184, 188; 206/455

[56] References Cited

U.S. PATENT DOCUMENTS

| | | | |
|---|---|---|---|
| 2,247,794 | 7/1941 | Wallach | 118/308 |
| 3,321,078 | 5/1967 | Treiber | 206/455 |
| 3,741,386 | 6/1973 | Schmidt | 206/455 |
| 3,955,092 | 5/1976 | Hubert | 271/131 |
| 4,100,559 | 7/1978 | Wareham et al. | 354/277 |
| 4,135,800 | 1/1979 | Weidanz et al. | 354/174 |
| 4,303,160 | 12/1981 | Weidanz et al. | 206/455 |
| 4,555,213 | 11/1985 | Tamura et al. | 414/412 |
| 4,623,073 | 11/1986 | Hansen | 221/45 |
| 4,783,019 | 11/1988 | Schmidt et al. | 242/74 |
| 4,809,313 | 2/1989 | Gandolfo | 378/182 |
| 4,860,042 | 8/1989 | Tajima et al. | 354/277 |
| 4,909,389 | 3/1990 | Plessers et al. | 206/455 X |

FOREIGN PATENT DOCUMENTS 2803050 8/1979 Fed. Rep. of Germany.

Primary Examiner—Michael L. Gellner
Assistant Examiner—Howard B. Blankenship
Attorney, Agent, or Firm—Frank Pincelli

[57] ABSTRACT

A magazine has a space for receiving a package containing a stack of film sheets enclosed within a bag. The bag is removable from the stack of sheets while the package is within the magazine by exerting a pulling force on the bag. Means are provided within the magazine for flexing the stack of film sheets in response to pulling of the bag from the stack, thus loosening adjacent sheets in the film stack that may be stuck together and facilitating removal of the sheets seriatim.

3 Claims, 2 Drawing Sheets

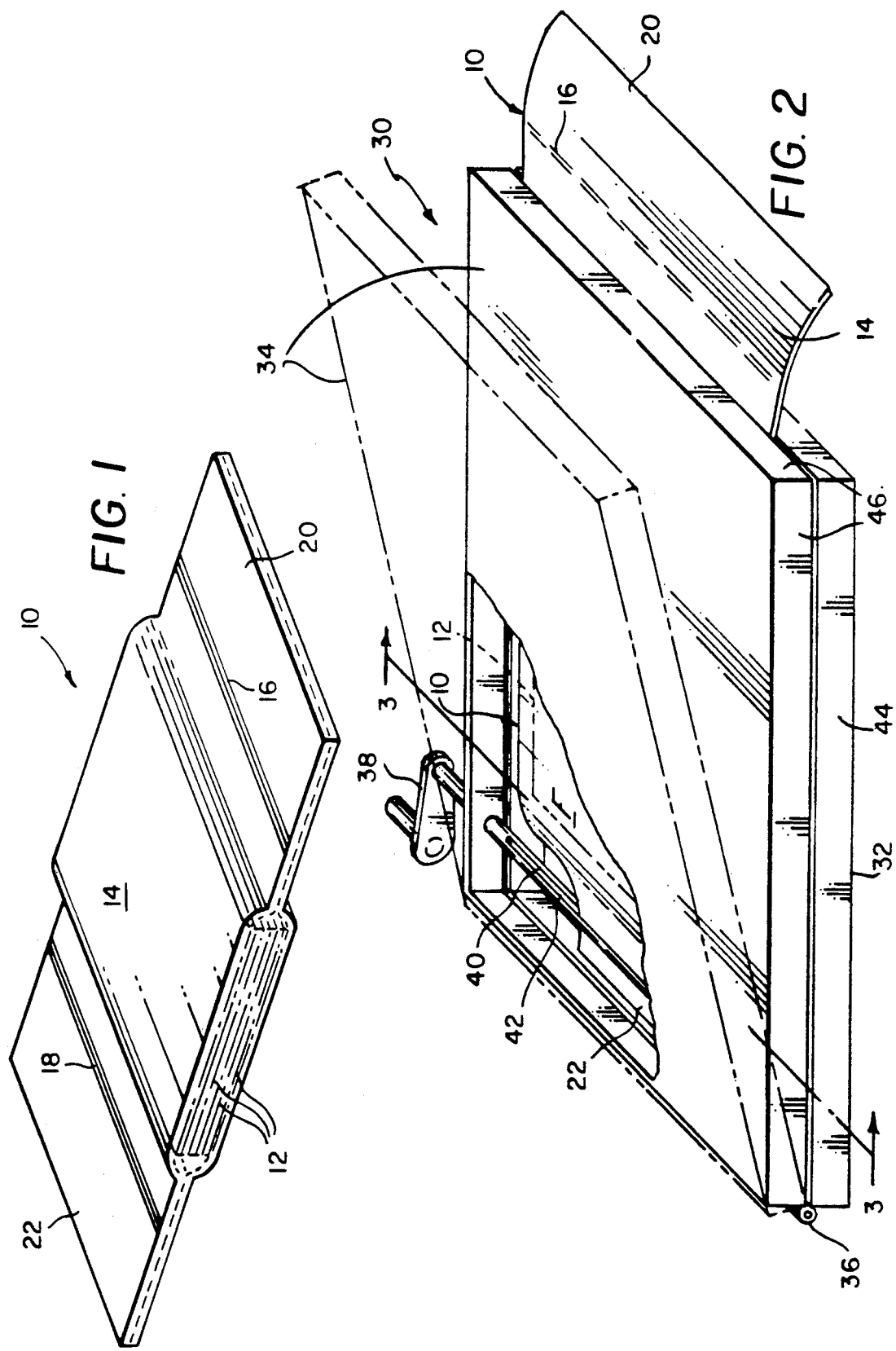

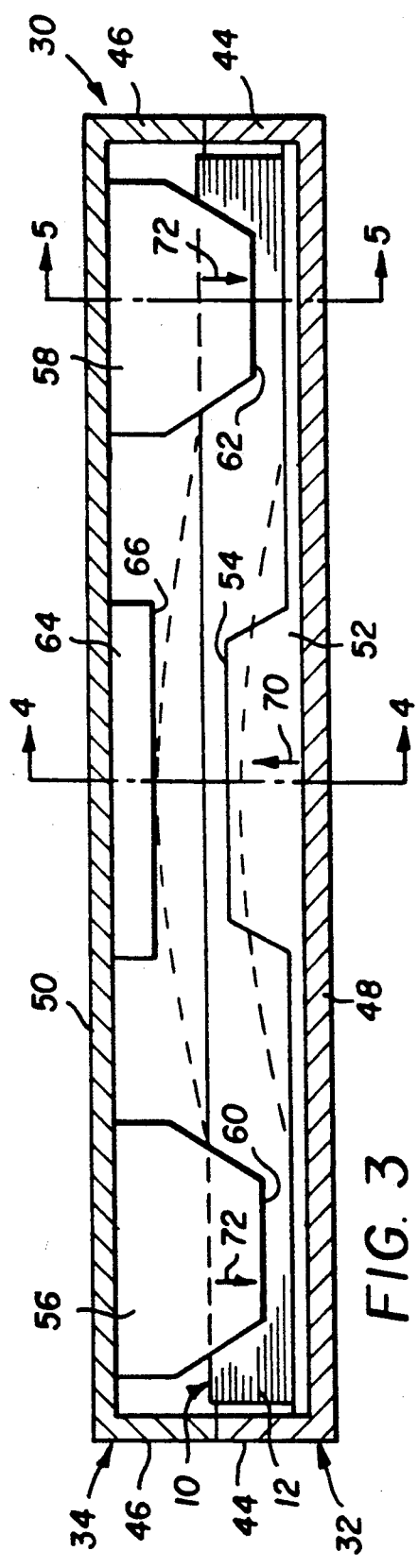
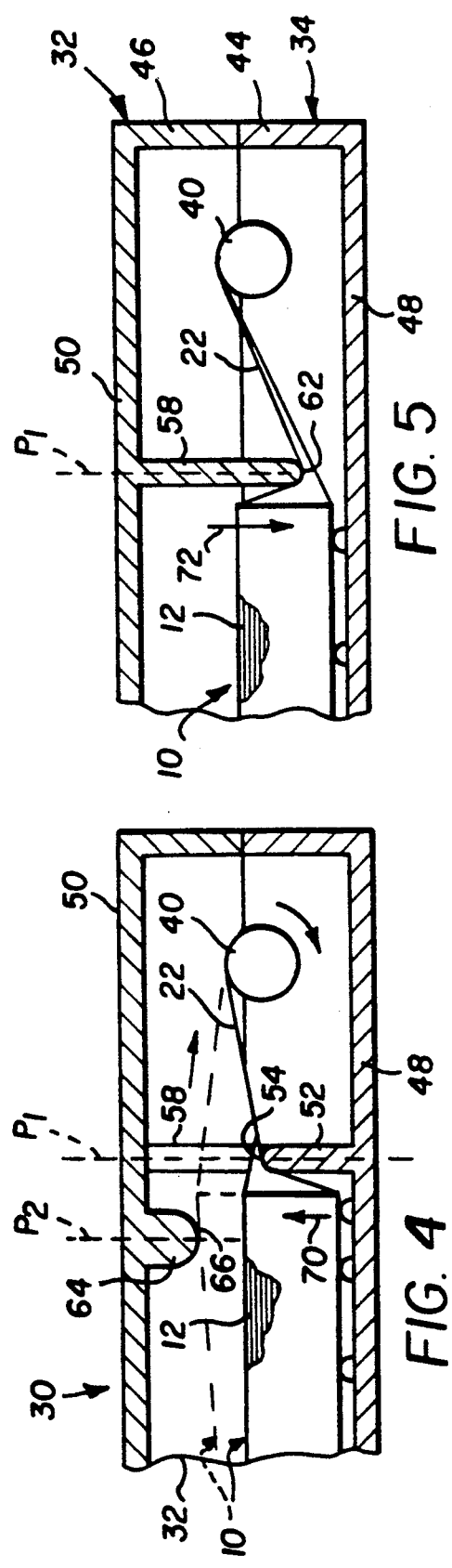

FILM SUPPLY MAGAZINE

CROSS-REFERENCE TO RELATED APPLICATIONS

Reference is made to the commonly-assigned, co-pending U.S. patent application Ser. No. 558,271, filed Oct. 25, 1990 in the names of M. L. Koelsch et al., entitled "Magazine for a Stack of Film Sheets", now U.S. Pat. No. 5,019,848.

BACKGROUND OF THE INVENTION

A film magazine as disclosed in the before-mentioned U.S. Pat. No. 5,019,848 has a space formed inside the magazine for receiving a package comprising a stack of film sheets located within a bag of light tight material. When the bag is positioned within the magazine and the magazine closed, one end portion of the bag is cut and then the bag is removed from the stack of sheets. As the bag is removed, it is pulled through a pair of stripper bars in the magazine adjacent one side edge of the stack of sheets. The bars are shaped so that a curved slot is formed between them. This curved slot enables the bag to be withdrawn through the slot while the bars block movement of film sheets through the slot with the bag.

Magazines of the kind disclosed in such application may contain about 150 sheets of film, for example. There is a tendency for photographic film sheets in a stack to stick together, especially when they are in a package that formed under a vacuum, and under certain temperature and humidity conditions. When the sheets stick together, it is difficult to remove them seriatim by use of suction cups or other feeding devices. This can result in the failure to feed a sheet or the feeding of more than one sheet at a time. The tendency of sheets of film in a stack to stick together can be overcome by flexing the stack of sheets. However, users of equipment which receive magazines containing film stacks cannot be relied on to always flex the film package to unstick the sheets prior to loading the package into a magazine.

SUMMARY OF THE INVENTION

Accordingly, an object of the invention is to provide a magazine for receiving a package having a stack of film sheets enclosed within a flexible bag, wherein the sheets are flexed in response to removal of the bag from the stack of sheets.

The present invention relates to an improvement in a magazine of the kind that receives a package containing a stack of sheets in a bag, and the bag is removed while the package is within the magazine. A plurality of stops are provided within the magazine adjacent the package. The bag is removed by pulling the bag past the stops, and the stops are located relative to each other so that the sheets are flexed as the bag is removed.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 1 is a perspective view of a package of film sheets of the kind that can be used in the magazine of the invention;

FIG. 2 is a perspective view of a preferred embodiment of a magazine of the present invention;

FIG. 3 is a transverse, cross-section view taken generally along line 3—3 of FIG. 2; and FIGS. 4 and 5 are fragmentary cross-section views taken along lines 4—4 and 5—5, respectively, of FIG. 3.

DETAILED DESCRIPTION OF THE PREFERRED EMBODIMENT

In accordance with the present invention, a reusable, interchangeable film magazine is adapted to receive and hold a package containing a stack of film sheets enclosed within a light-tight flexible bag, and to remove the package material so that the sheets can be removed seriatim from the magazine and exposed, processed, etc. Before proceeding with a description of the magazine of the invention, a package suitable for use with the magazine will be described briefly.

Referring now to FIG. 1 of the drawings, a package generally designated 10 comprises a stack of film sheets 12 enclosed within a light-tight, flexible bag 14. Film sheets 12 may comprise sheets of x-ray film or laser print film, for example. Sheets 12 in a particular package 10 preferable are all the same size, however, similar film packages 10 can contain film sheets 12 of various sizes. The bag 14 can be formed from a flexible barrier wrap material which is placed around the stack of film sheets 12 and sealed to form a light-tight package. Sealing of the package can be accomplished by lines of heat sealing as shown at 16 and 18, and additional lines of heat sealing may be required, depending upon the manner of forming the bag 14. The heat seal line 16 is formed in a leading end portion 20 of the bag while heat seal line 18 is in a trailing end portion 22 of the bag. The bag may be formed under a vacuum so that the bag material clings tightly to the sheets 12 and the sheets tend to stick together.

Referring to FIG. 2, a magazine 30 of the invention comprises two portions that jointly define a space within the magazine for receiving the sheets of film. More specifically, the magazine has a lower portion 32 and an upper portion 34 which are illustrated as being rectangular in shape and substantially the same size. The portions 32,34 can be secured together along one side edge by a hinge 36 in a conventional manner. This enables the portion 34 to be raised, as shown in phantom in FIG. 2, for loading a package 10 of film sheets into the magazine and for removing the packaging material from within the magazine.

The magazine 30 is of the kind which is adapted to remove the packaging material from the sheets after the package is loaded in the magazine and the magazine is closed in a light-tight manner. Thus, the magazine is provided with a crank or handle 38 that is connected to a spindle 40 inside the magazine. The spindle has a slot 42 which receives end portion 22 of the package to attach the package to the spindle. The package is attached to the spindle when the package is loaded into the magazine and while the cover is open. Then the cover is closed and latched in the closed position. At this time, package end portion 20 and seal 16 are outside the magazine. Next, the package portion 20 is cut between the heat seal line 16 and the stack of sheets 12, and the handle 38 is rotated to wind the packaging material onto the spindle and thereby remove it from the sheets of film within the magazine. This can be accomplished in a daylight environment.

Portions 32,34 have side edge walls 44,46 that extend entirely around the magazine and define a portion of the space within the magazine that receives the sheets of film. A light lock (not shown) is provided between the edge walls 44,46. Lower portion 32 has a bottom 48 (FIGS. 3-5) at the lower edge of walls 44 on which the package rests. Portion 34 has a cover 50 at the top of walls 46.

As best illustrated in FIGS. 3-5, when the film package 10 is loaded into the magazine 30, the top of the film package is spaced from the cover 50 of the magazine so there is room for the package to move upwardly to flex the sheets in the package in the manner explained in detail later. A stop 52 on the bottom 48 of the magazine projects upwardly toward the cover 50 of the magazine. Stop 52 has a rounded upper edge 54 which is spaced from the cover 50 by a distance sufficient to allow the bag 14 to be pulled between the upper edge of the stop and the cover during removal of the bag in the manner explained later. As indicated in FIG. 4, stop 52 is located between the spindle 40 and the side edge of the film package nearest the spindle. Note also that the stop projects upwardly by a distance slightly less than the height of the stack of film sheets 12. The stop is effective to prevent movement of the sheets 12 toward the spindle during removal of the bag.

A second stop 56 and a third stop 58 (FIGS. 3 and 5) project downwardly from the inside of cover 50 toward the bottom 48 of the magazine. Stops 56 and 58 each have a rounded lower edge, as shown at 60 and 62, respectively. The lower edges of the stops 56,58 are spaced from the bottom 48 by a distance sufficient to allow the bag to be pulled between the stops and the bottom 48 during removal of the bag. Also, the lower edges 60,62 of stops 56 and 58 are nearer to the bottom 48 of the magazine than is the upper edge 54 of the stop 52.

Stops 56,58 are spaced from each other, laterally across the width of the magazine, but are aligned with each other so that the lower portions of the stops are located between the spindle 40 and the adjacent side edge of the film package 10. Stops 52, 56 and 58 occupy a common plane $P_2$ (FIGS. 4 and 5) extending transversely across the magazine between the spindle and the film package, and stop 52 is located approximately midway between the stops 56,58. Also, stop 52 is at the center portion of the magazine in a transverse direction, whereas stops 56,58 are near, but spaced from, the side walls 46. The lower edges 60,62 of stops 56,58 are below the upper edge 54 of stop 52. As a result, the bag is curved as it is pulled under the stops 56,58 and over the stop 52 during winding of the bag onto the spindle 40.

A fourth stop 64 is carried by the cover and projects downwardly toward the bottom 48 of the magazine. Stop 64 is located relative to the space in the magazine for the package so that the fourth stop is above a package 10 in the space to limit upward movement of the sheets during removal of the bag from the sheets, as explained later. Thus, the fourth stop is located in a second plane $P_2$ that is parallel to and offset to the left, as viewed in FIG. 4, from the plane $P_1$ occupied by stops 52, 56 and 58. Stop 64 is directly above the end portion of the sheets nearest to the spindle 40. Also, stop 64 is located between stops 56,58, spaced from such stops, and is offset to the left therefrom, as viewed in FIG. 4.

Stop 64 has a rounded lower edge 66 that is spaced from the upper edge 54 of stop 52 so that there is sufficient room to pull the bag 14 over the edge 54 of stop 52 and under the edge 66 of stop 64. However, the spacing between edges 54,56 is such that the stack of sheets 12 cannot move between the edges.

When a stack of film sheets is to be loaded into a magazine 30, the upper portion 34 of the magazine is swung upwardly as indicated in phantom in FIG. 2 to open the magazine. Then a film package 10 is placed on the bottom 48 of the magazine. The end portion 22 is threaded into the slot 42 of the spindle. The end portion 20 is placed between walls 44,46 at the end portion of the magazine opposite from the spindle, as illustrated in FIG. 2. Then the upper portion 34 is returned to its closed (solid line) position, and bag 14 is cut or torn between the seal line 16 and the magazine. Handle 38 is turned to rotate the spindle 40 and wind the bag 14 onto the spindle, thereby removing the bag from the sheets.

Rotation of the spindle exerts a pulling force on the bag in a direction that is generally parallel to the plane of the stack of sheets 12. As the bag is pulled from the stack of sheets, the bag passes over the upper edge 54 of stop 52 in the center portion of the magazine and under edges 60,62 of stops 56,58 at the side edges of the magazine. This pulling movement of the bag at two different levels, as shown in FIGS. 4 and 5, produces an upward component of force in the center portion of the stack of film sheets as shown by arrow 70 in FIGS. 3 and 4. This force causes the film sheets to flex upwardly in the center, as indicated in dotted lines in FIGS. 3 and 4, with the lower surface 66 of stop 64 limiting upward movement of the stack of sheets.

Similarly, pulling of the bag under the stops 56,58 near the side edges of the magazine produces a downwardly directed force, indicated at 72 in FIGS. 3 and 5, which urges the side edges of the film sheets against the bottom 48 of the magazine. The result of these forces is a flexing of the film sheets that produces a bowing in the center of the film sheets. As the film sheets flex, they are loosened or separated relative to each other. This increases the reliability in feeding sheets seriatim from the stack after the bag has been removed and reduces the likelihood of inadvertently feeding two or more sheets at a time.

A number of advantages are achieved by the improved magazine of this invention. First of all, the stack of film sheets are flexed at the time the bag is removed from the sheets, thereby improving reliability of feeding the sheet seriatim and reducing the likelihood of double sheet feed of the sheets. As noted earlier, there is a tendency for film sheets to stick together, especially under certain conditions of temperature and humidity, and when the package has been vacuum sealed. Secondly, this flexing of the sheets is done automatically in response to the force exerted by removal of the bag from the sheets. Therefore, it is not necessary to rely on a machine operator to remember to manually flex the package of sheets before loading the bag into the magazine or to activate other devices that function solely for the purpose of flexing sheets in a magazine.

The invention has been described in detail with particular reference to a preferred embodiment thereof, but it will be understood that variations and modifications can be effected within the spirit and scope of the invention.

I claim:

1. In a magazine having an upper portion and a lower portion which defines a space within the magazine for receiving a package comprising a stack of sheets within a bag, the improvement comprising:

said magazine defining a space between the top of the package and the upper portion of the magazine, a plurality of projecting members within the magazine adjacent the space for the package, the members defining a path for the bag as it is removed from the sheets, and the members being located with respect to each other such that an upward component of force is applied to the stack of sheets so as to move the stack of sheets in an upward manner so as to flex the sheets within the stack as the bag is pulled past the members during removal of the bag from the sheets, and means limiting flexing of the sheets.

2. In a magazine as set forth in claim 1 wherein the lower portion and the upper portion are movable with respect to each other to open and close the magazine, the members project from the lower portion and the upper portion in space relation to each other.

3. In a magazine having a plurality of side walls, a bottom and a cover defining a space within the magazine for receiving a package comprising a stack of film sheets enclosed within a bag, the bag being removable from the stack of sheets while the package is within the magazine by exerting a pulling force on the bag in a first direction generally parallel to the plane of the stack of sheets, the improvement comprising:

a first stop projecting from the bottom toward the cover, the stop having an upper edge spaced from the cover by a distance sufficient to allow the bag to be pulled between the stop and the cover during removal of the bag, a second stop and a third stop projecting from the cover toward the bottom, the second and third stops each having a lower edge spaced from the bottom by a distance sufficient to allow the bag to be pulled between the stops and the bottom during removal of the bag, the lower edges of both the second stop and the third stop being nearer to the bottom than the upper edge of the first stop, the second and third stops being spaced from each other, and the first stop being positioned between and spaced from the second and third stops, the first, second and third stops all being located within the magazine relative to the space for the package so that such stops are at one side edge of the space and jointly block movement of the sheets in the first direction during removal of the bag from the sheets, and a fourth stop carried by the cover and located relative to the space for the package so that the fourth stop is above a package in the space to limit upward movement of the sheets during removal of the bag from the sheets, the fourth stop being between and offset from the second and third stops, and the fourth stop having a lower edge located above the upper edge of the first stop, whereby a pulling force exerted on the bag in the first direction pulls the bag from the stack of sheets over the first stop and under the second, third and fourth stops with the relationship of the stops relative to each other and the package causing the sheets to flex upwardly in the area of the first and fourth stops and with the second and third stops holding the sheets down.

* * * * *